June 19, 1962 A. M. WARN 3,039,425
SAFETY ALARM SIGNALS FOR VEHICLES
Filed Dec. 5, 1960
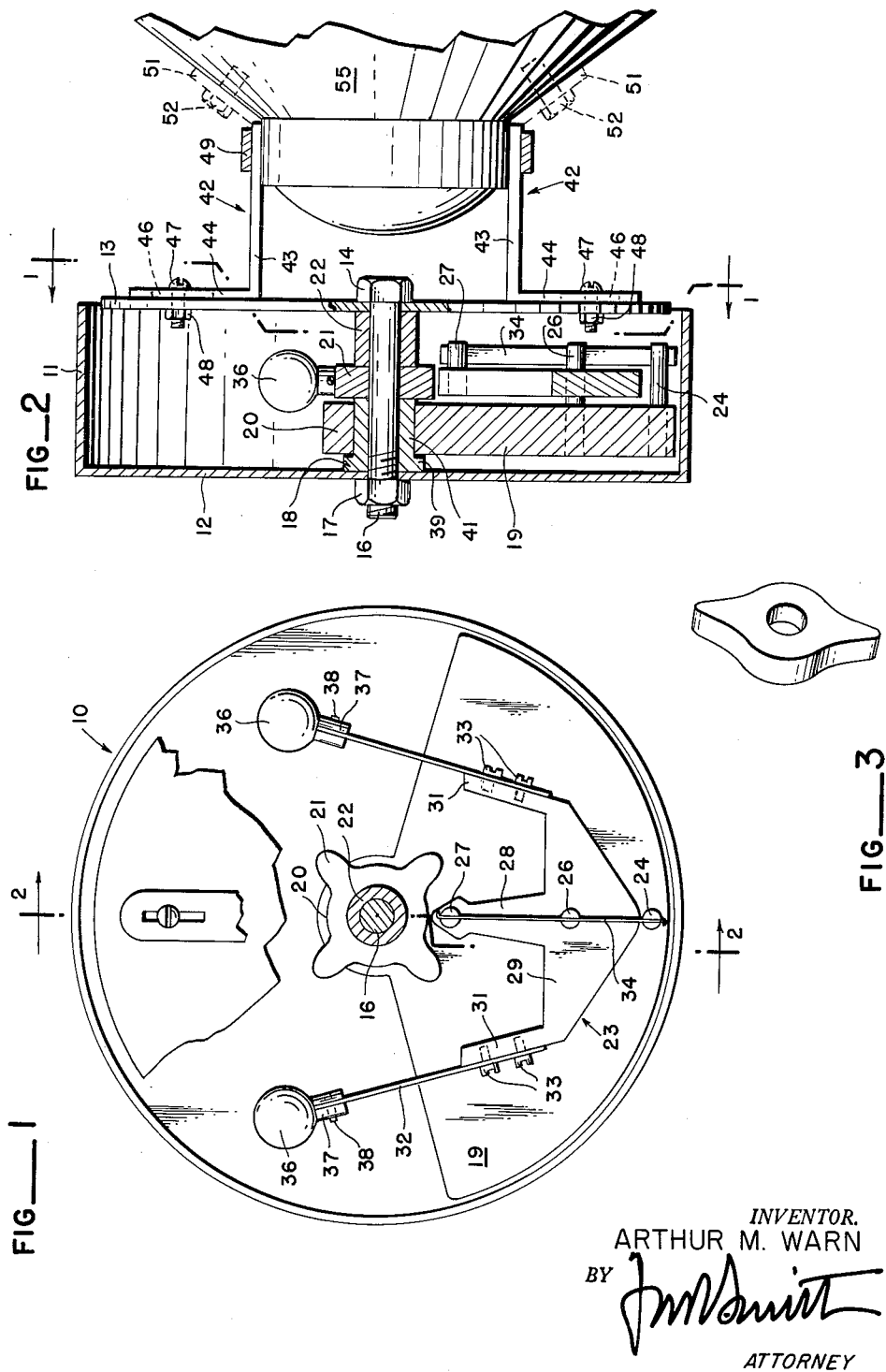
INVENTOR.
ARTHUR M. WARN
BY
ATTORNEY

United States Patent Office 3,039,425
Patented June 19, 1962

3,039,425
SAFETY ALARM SIGNALS FOR VEHICLES
Arthur M. Warn, 18221 Pacific Highway S., Seattle, Wash.
Filed Dec. 5, 1960, Ser. No. 73,861
3 Claims. (Cl. 116—60)

This invention relates to new and useful safety signalling devices for vehicles.

The broad object of this invention is to provide a safety alarm signal for vehicles such as trucks, tractors, forklift trucks and the like, operated in the areas in which there are people exposed to the danger of being struck by such a vehicle. For example, loading and unloading docks and platforms, warehouses and stockrooms may require the use of such vehicles where people are likely to be moving about on foot. This device, attached to a vehicle wheel, will provide a warning to people nearby who may be engaged in other activity and whose attention may be diverted away from the dangers of a nearby moving vehicle. Similarly this device is designed to warn individuals whom the driver may have failed to see.

More specifically this invention has as its object to provide vehicles with a safety alarm which produces a continuous audible alarm regardless of the direction of travel of the vehicle.

Another object is the provision of a signalling device of the character described which is entirely self-contained, requiring no outside electrical, mechanical, hydraulic or other power or motive connections, and which, despite the fact that it contains movable parts, requires only a single rigid attachment to the vehicle structure. Generally the motive power is provided by the relative movement between certain parts which revolve with a wheel of the vehicle and certain other parts which are restrained against rotation by a counter or pendulum-type or eccentric-type weight.

Another object of this invention is to provide a safety alarm signal for vehicles which is simple and economical in construction, efficient and dependable in operation, and readily adaptable to any type of vehicle moving on wheels.

With these in view, as well as other objects which will appear in the course of specification, reference may be had to the following drawings, wherein:

FIGURE 1 is a rear elevational view of the device taken along line 1—1 of FIGURE 2 in which the supporting plate has been partially broken away to show the relationship of the various elements;

FIGURE 2 is a side elevational view of the device taken along line 2—2 in FIGURE 1; and FIGURE 3 is a view of an alternate cam having 2 lobes.

The Bell

Referring to the drawings in detail it will be seen that the embodiment of the invention illustrated comprises a sounding bell, generally designed by reference numeral 10, in the form of a shallow steel cylinder closed at one end and open at the other end. However, the bell may also be of other shapes such as, for example, concavo-convex as a conventional alarm gong, or conical. Furthermore it is contemplated that the bell may be made of metal other than steel.

The bell 10 comprises circular end wall 12 having a flange or cylindrical side wall 11 around its edge. Bell 10 is apertured at its axis to be mounted on shaft 16 of bolt 14. Within bell 10 and abutting end wall 12 is a bushing generally designated by reference numeral 18 and which is slidably received on shaft 16. Also within bell 10 and pivotally mounted on bushing 18 is weight 19 having a hub portion 20 apertured to be received on bushing 18. Note that the generally cylindrically shaped bushing 18 is flanged as at 39, which flange serves to space weight 19 from end wall 12. The cylindrical or sleeve portion 41 serves as the bearing for weight 19.

The Counterweight

Weight 19 is disposed eccentrically of shaft 11 and since it will normally hang downwardly under the force of gravity, it prevents parts attached to it from rotating as the shaft turns. The weight may be of any form or contour so long as it contains enough mass below its hub to counter-balance forces of friction and weight of the striker heads and their supporting structure. Preferably the weight 19 is formed of heavy plate metal and is less than fully semi-circular in shape as can be seen in FIG. 1.

Bushing 18 may be formed of plastic or other synthetic compositions or metal such as brass, all of which should be suitable bearing material. The sleeve or cylindrical portion 41 of the bushing, as can be seen, is slightly longer than weight 19 is thick so that said weight has limited axial movement on sleeve 41 in order that it may retain its free pivotability.

An interchangeable cam 21 abuts bushing 18 and functions as the actuating means for the striker heads which will be more fully described hereinafter. FIG. 3 illustrates other cam which may be used with this device, but it should be apparent that the cam may be provided with any number of lobes. The cams, of course, as with bushing 18, may be made of a wide variety of materials such as hard wood, metal, plastic or other synthetic compositions which are essentially non-resistant. Cam 21, of course, has an aperture to be slidably received on shaft 16.

A spacer sleeve 22, which is received on shaft 16, abuts cam 21. One end of sleeve 22 fits snugly against the cam while the other end abuts supporting plate 13 which is also apertured to be received on shaft 16. When nut 17 is tightened on shaft 16, bell 10, bushing 18, cam 21, sleeve 22 and supporting plate 13 are secured together as a single rigid unit.

Clapper Mechanism

Weight 19, preferably made of heavy plate metal, is less than fully semi-circular in shape as can be seen in FIG. 1. Near the lower periphery of and located on the center line running radially through weight 19 is an anchor pin or stud 24 extending perpendicularly outwardly from the face of said weight. Said stud 24 may be integrally connected to said weight, as by welding, or threaded therein. On the same center line at a point somewhat greater than half the distance from the axis of the bell 10 and shaft 16 to the side wall 11 is pivot pin or stud 26. Stud 26 may be attached to weight 19 in the same manner as stud 24. Reference numeral 23 generally designates the rigid follower mechanism. Said follower 23 has a main body or beam portion 29 similar in shape to a flat isoscoles triangle in which the apex is pointed downwardly. Extending upwardly from the center of the upper edge of beam portion 29 is follower arm or projection 28 the purpose of which is to engage the lobes of cam 21. When the projection 28 is out of engagement with the lobes of cam 21 its upper end is spaced a slight distance from the hub of cam 21. The projection 28 is rounded at the extremity and in general is similar in form to a pointer. However, it is possible for a roller to be inserted on the end of projection 28 to serve the same function on the rounded end. Beam portion 29 of follower mechanism 23 is apertured approximately in its center to be pivotally received on the stud 26 extending outwardly from the face of weight 19.

Projection 28 has an anchor pin or stud 27 extending outwardly from the upper extremity. Said stud 27 is shorter in length than either of pins 24 and 26. Stud 27 when viewed from a side elevational position as in FIG. 2 may be seen to extend outwardly from the face of weight 19 approximately equal to the distance by which pins 24 and 26 extend therefrom. Stated otherwise, the ends of each of pins 24 and 26 and stud 27 lie in a plane parallel to the face of weight 19. Each of pins 24 and 26 and stud 27 are slotted in such a manner that a single, straight length of leaf spring stock may be inserted into the three slots. When thus inserted it may be seen that the follower mechanism is resistantly biased to a central or neutral position in which projection 28 points approximately to the axis of shaft 16 but, as stated above, spaced slightly from contact with cam 21. In other words the spring 34 lies approximately on the center line running through the axis of shaft 16 and radially through weight 19 until such time as a lobe on cam 21 rotates to force the follower to one side or the other. When the lobe by further rotation disengages the follower (projection 28) spring 34 snaps the follower back to the neutral position described and shown.

Considering the follower mechanism 23 further it may be seen that extending upwardly and outwardly from either end of beam portion 29 are rigid supporting arms 31. Said supporting arms 31, like projection 28, are preferably integrally formed with the beam 29. Flexible striker arms 32 are secured to supporting arms 31 by screws 33. The flexible striker arms 32 are formed of heavier leaf spring stock than spring 34 to compensate for the weight of striker heads 36. Heads 36 are generally spherical in shape and integrally formed therewith are depending base portions 37. The base portions 37 are slotted to receive flexible striker arms 32, said arms being fixedly attached to the base portions 37 of the striker heads by screws or rivets 38. The flexible striker arms are of such length as to space the striker heads 36 above the cam 21 and a short distance from the side wall 11.

The manner in which the invention is attached to the vehicle is shown in FIG. 2. Supporting plate 13 is designed to be in radially spaced relation to the open end or edge of side wall 11, and securely attached, as described above, to shaft 16 of bolt 14. In addition to its support function, and because it substantially covers the open end of the bell, plate 13 also serves to protect the operation of moving parts within bell 10 from being impaired and obstructed with grease and dirt and other deleterious matter. It is contemplated that shaft 16 may be integrally connected to plate 13, as, for example, by welding it thereto.

Support Mechanism

In order to support the invention on the wheel hub 55 of the particular vehicle it is necessary to fashion three or four brackets, identical to brackets 42 shown for illustrative purposes, and spaced at either 90° or 120° intervals as may be determined expedient by a person skilled in the art. Brackets 42 have legs 43 and at right angles thereto legs 44. Legs 44 are provided with slots 46 for the purpose of permitting precise adjustment of the invention on the wheel hub 55. Securing brackets 42 to the plate 13 are bolts 47 and nuts 48. Assembled as described this invention forms a rigid unit ready for attachment to the vehicle hub.

Legs 42 may be secured to hub 55 by strapping said legs thereto with a steel strap 49 having an appropriate tightening or cinching mechanism (not shown). Alternatively, the brackets 42 may be shaped so that third legs such as legs 51, shown in dotted lines, would fit the contour of the wheel to be attached thereto by bolts or screws 52.

Operation

The operation of the safety alarm signal is the same regardless of the direction of travel of the vehicle. As this device rotates with the wheel, weight 19, being freely pivotable and eccentrically disposed on the underside of shaft 16 by gravity, retains a substantially stationary position below said shaft. Hence the follower mechanism 23 to which the striker heads 36 are attached is also restrained against rotation. The lobes of cam 21, however, in rotating with bell 10 move into contact with projection 28 on the follower mechanism 23 and force the follower to pivot away from its neutral position on pin 26 against the restraining force of spring 34. Thus one striker head moves toward side wall 11 and coming into contact with said side wall produces the audible alarm signal. For instance if bell 10 rotates counter clockwise as viewed in FIG. 1 the head on the right strikes the side wall. The converse is true as the bell is rotated clockwise. The number of alarm signals sounded during a single revolution of the bell is determined by the number of lobes on the particular cam employed.

It will be understood that the showing of the device is very diagrammatic and that the invention is capable of many refinements which will readily occur to those skilled in the art. It is also contemplated that this invention may also be used on vehicles which run on tracks and on machinery such as gears and other wheels. In short this invention has application to most any type of body which rotates, the turning of which should be accompanied by a safety alarm signal. I intend, therefore, to be limited only as indicated by the scope of the following claims.

What is claimed as new is:

1. A vehicular signal alarm for sounding a continuous audible warning of wheel rotation in either direction of wheel travel, comprising:

(a) a shaft for coaxial rotation with a wheel;
 (b) a bell fixedly mounted on said shaft for rotation therewith;
 (c) a weight pivotally mounted on said shaft within said bell and depending from said shaft in a relatively stationary position under the force of gravity;
 (d) a cam fixedly secured to said shaft for rotation therewith;
 (e) a cam follower means comprising a beam portion pivotally mounted on said weight, an upstanding arm at each end of said beam portion, a cam follower projection on said beam portion rising thereabove toward said cam, spring means biasing said beam to a neutral position in which the upper end of said projection is slightly spaced from said cam but in the path of travel of the lobes on said cam as said cam rotates; and
 (f) a striker head flexibly attached to each of said upstanding arms and in striking relation to said bell so that as said cam rotates and engages said projection said follower means is caused to pivot whereby one of said striker heads moves into contact with said bell.

2. A vehicular signal alarm according to the structure of claim 1 in which there is a first stud attached to and near the periphery of said weight below said beam portion, a second stud attached to said weight above said first stud and on which said beam portion pivots, a third stud on the upper end of said projection, means adapted to be attached to said first, second and third studs to bias said cam follower means to said neutral position.

3. A vehicular signal alarm for sounding a continuous audible warning of wheel rotation in either direction of wheel travel, comprising:

(a) a shaft for coaxial rotation with a wheel;
 (b) a bell fixedly mounted on said shaft within said bell and depending from said shaft in a relatively stationary position under the force of gravity;
 (c) a cam fixedly secured to said shaft for rotation therewith;
 (d) a cam follower means comprising a beam portion pivotally mounted below said cam on said weight, a rigid upstanding supporting arm at each end of said beam portion, a cam follower projection on said beam portion extending from a point midway between said arms upwardly toward said cam, spring means biasing said beam to a neutral position in which the upper end of said projection is slightly spaced from said cam but in the path of travel of the lobes on said cam a said cam rotates; and (e) a striker head flexibly attached to each of said upstanding arms and in striking relation to said bell so that as said cam rotates and engages said projection said follower means is caused to pivot whereby one of said striker heads moves into contact with said bell.

References Cited in the file of this patent

UNITED STATES PATENTS

| 716,471 | Pickop et al. | Dec. 23, 1902 |
| 2,802,441 | Epstein | Aug. 13, 1957 |